United States Patent
Lin et al.

(10) Patent No.: US 11,026,003 B2
(45) Date of Patent: Jun. 1, 2021

(54) OPTICAL NETWORK UNIT AND METHOD FOR TRANSMITTING DYNAMIC BANDWIDTH REPORT UPSTREAM INFORMATION

(71) Applicant: REALTEK SEMICONDUCTOR CORPORATION, Hsinchu (TW)

(72) Inventors: Hung-Wen Lin, Hsinchu County (TW); Mu-Jung Hsu, Miaoli County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/935,295

(22) Filed: Jul. 22, 2020

(65) Prior Publication Data

US 2021/0037300 A1 Feb. 4, 2021

(30) Foreign Application Priority Data

Aug. 2, 2019 (TW) .................................. 108127464

(51) Int. Cl.
*H04B 10/27* (2013.01)
*H04B 10/079* (2013.01)
*H04Q 11/00* (2006.01)

(52) U.S. Cl.
CPC ..... *H04Q 11/0067* (2013.01); *H04B 10/0795* (2013.01); *H04B 10/27* (2013.01); *H04Q 2011/0086* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0233197 A1* | 10/2006 | Elmoalem | .......... | H04Q 11/0067 370/468 |
| 2013/0230326 A1* | 9/2013 | Hu | ........................ | H04J 3/1652 398/67 |
| 2014/0186039 A1* | 7/2014 | Luo | ........................ | H04L 12/287 398/66 |
| 2014/0321854 A1* | 10/2014 | Ghazisaidi | ......... | H04Q 11/0067 398/58 |

* cited by examiner

*Primary Examiner* — Omar S Ismail
(74) *Attorney, Agent, or Firm* — WPAT, PC (57) ABSTRACT

Disclosed is an optical network unit (ONU) capable of reporting current Dynamic Bandwidth Report upstream (DBRu) information to an optical line terminal (OLT) according to the amount variation of to-be-transmitted upstream data in a buffer. The ONU includes: the buffer temporarily storing the to-be-transmitted upstream data; a register circuit recording previous data amount information related to the previous data amount of the buffer at a previous time point earlier than a current time point; a DBRu information generating circuit generating the current DBRu information according to an amount difference and a current data amount of the buffer at the current time point, wherein the amount difference is dependent on the difference between the previous data amount information and current data amount information that is dependent on the current data amount; and a transmitting circuit transmitting the current DBRu information to the OLT.

20 Claims, 7 Drawing Sheets

OPTICAL NETWORK UNIT AND METHOD FOR TRANSMITTING DYNAMIC BANDWIDTH REPORT UPSTREAM INFORMATION

BACKGROUND OF THE INVENTION

1. Field of the Invention

The present disclosure relates to a passive optical network (PON), especially to an optical network unit (ONU) applicable to a PON and a method for transmitting Dynamic Bandwidth Report upstream (DBRu) information.

2. Description of Related Art

Figure 1:
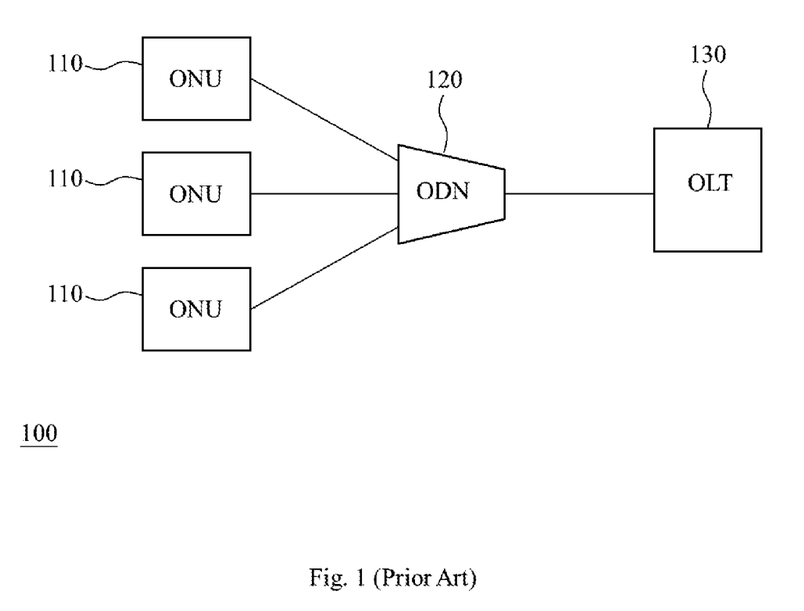
FIG. 1 shows a conventional GPON configuration.

FIG. 1 illustrates a conventional gigabit passive optical network (GPON) configuration. The GPON configuration 100 of FIG. 1 includes a plurality of optical network units (ONUs) 110, an optical distribution network (ODN) 120 including one or more passive optical splitter, and an optical line terminal (OLT) 130, wherein the ONUs 110 are connected to user devices and the OLT 130 is connected to the internet.

Figure 2:
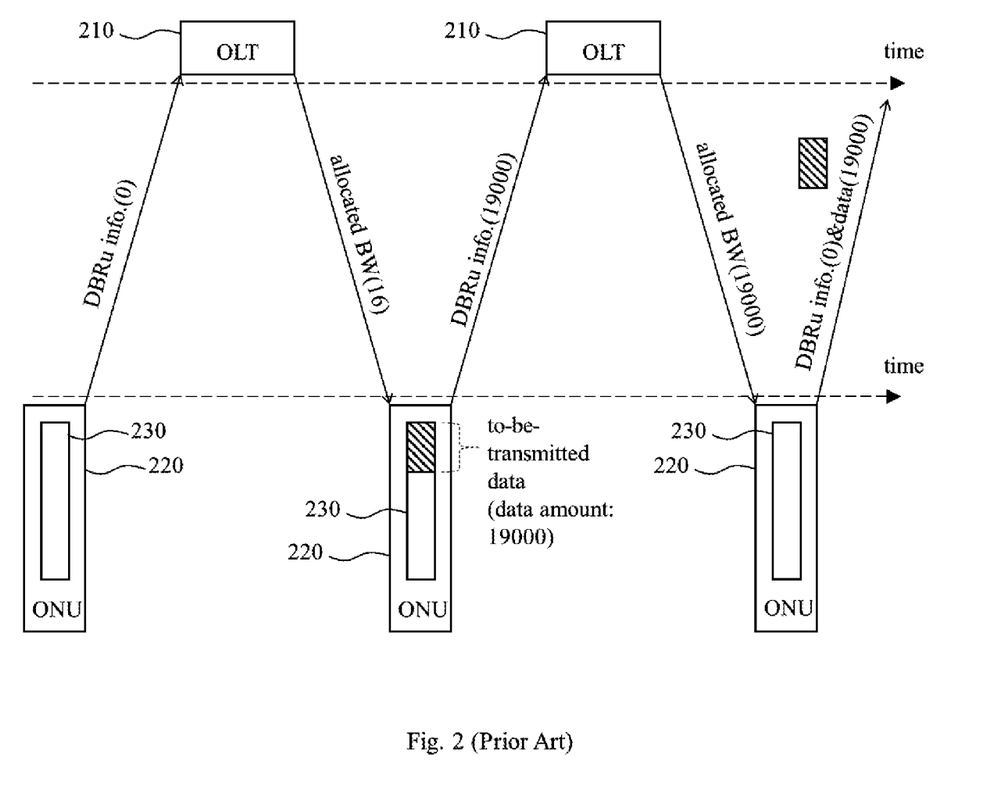
FIG. 2 illustrates the operation of a conventional GPON configuration.

Regarding the data transmission under the GPON configuration 100, if one of the ONUs 110 would like to transmit data to the OLT 130, this ONU 110 is only allowed to transmit data according to the bandwidth allocated by the OLT 130 during a timeslot predetermined by the OLT 130 so that two or more ONUs 110 will not transmit data simultaneously and the packet collision can be avoided. FIG. 2 shows an example of the above-mentioned data transmission. As shown in FIG. 2, before the beginning of a timeslot determined by an OLT 210, the upstream data of an ONU 220 are queued in a buffer 230 of the ONU 220; after the beginning of the timeslot, the ONU 220 is allowed to transmit the data in the buffer 230 according to the bandwidth allocated by the OLT 210. If the mode of the dynamic bandwidth allocation of the OLT 210 is a Status Report (SR) mode, the ONU 220 is requested to report Dynamic Bandwidth Report upstream (DBRu) information to the OLT 210 so that the OLT 210 can allocate the bandwidth according to this DBRu information. If the DBRu information requests zero amount of data, the OLT 210 may allocate the minimum bandwidth (e.g., 16 bytes) to the ONU 220. The definition of DBRu information is found in the G.984.3 standard of International Telecommunications Union-Telecommunication Standardization Sector (ITU-T). DBRu information is used for reporting information of the data amount of upstream data of the ONU 220 to the OLT 210; one unit of this data amount that the DBRu information of FIGS. 2-3 requests is one byte for better understanding, but one unit of the data amount that actual DBRu information requests may be a queue length being equal to the data amount of the to-be-transmitted upstream data (e.g., X bytes) in the buffer 230 divided by a reporting block size (e.g., 48 bytes).

Figure 3:
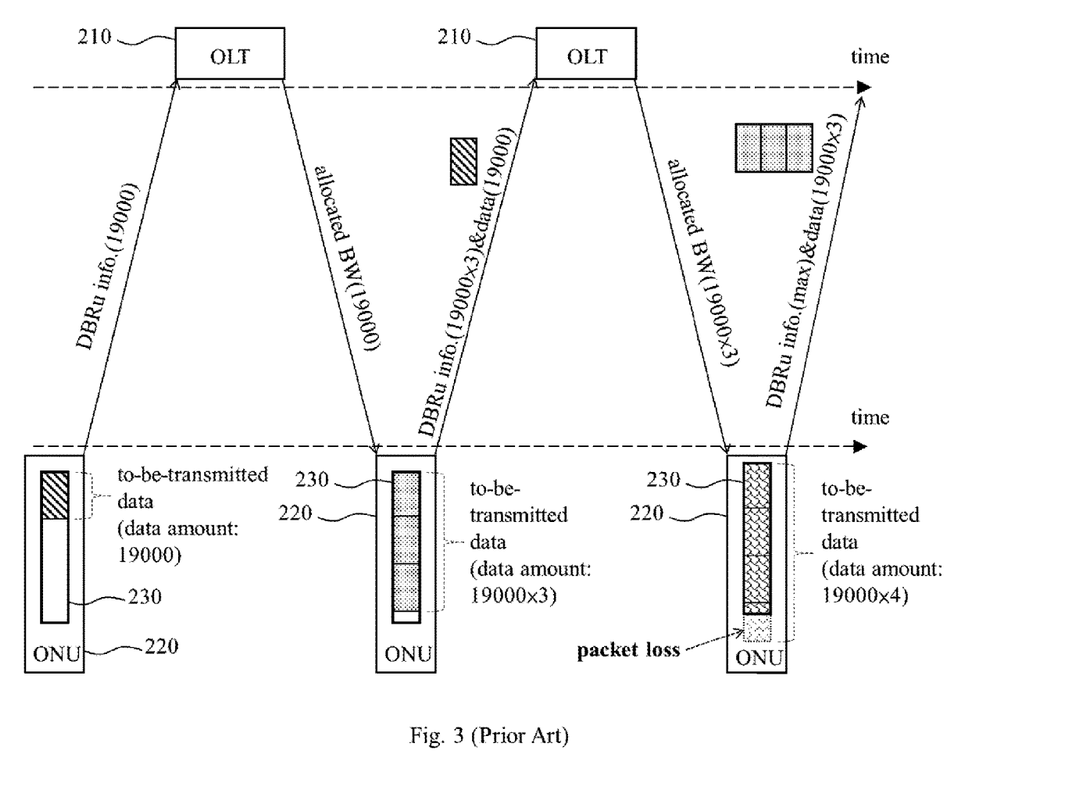
FIG. 3 shows that packet loss occurs due to the burst of to-be-transmitted upstream data.

In light of the above, the OLT 210 distributes bandwidth among ONUs according to the DBRu information of these ONUs in the SR mode. However, as shown in FIG. 3, if the ONU 220 is going to continuously transmit massive data (e.g., 19000 bytes→3×19000 bytes→4×19000 bytes) to the OLT 210 and the latest DBRu information does not fully reflect the incremental ratio of the to-be-transmitted data, the bandwidth allocated by the OLT 210 to the ONU 220 will be insufficient and the total amount of the to-be-transmitted data will exceed the storage capacity of the buffer 230 of the ONU 220, which will lead to packet loss. The annotation "max" in FIG. 3 indicates that the data amount that the DBRu information requests is equal to the maximum storage amount (i.e., the storage capacity) of the buffer 230.

In order to prevent the aforementioned problem, a conventional GPON system usually uses one of the following solutions: (1) accelerating an OLT in calculation and allocation of dynamic bandwidth allocation; (2) having an OLT adopt an algorithm capable of predicting a burst of to-be-transmitted data; and (3) increasing the buffer capacity of an ONU. However, the solution (1) and solution (2) are not practicable for those GPON systems already in position because it's not easy to upgrade the OLTs of those GOPN systems; and the solution (3) will lead to the increase of cost and power consumption of an ONU.

SUMMARY OF THE INVENTION

An object of the present disclosure is to disclose an optical network unit (ONU) and a method for transmitting Dynamic Bandwidth Report upstream (DBRu) information as improvements over the prior art.

An embodiment of the ONU of the present disclosure can report current DBRu information to an optical line terminal (OLT) according to an amount variation of to-be-transmitted upstream data in a buffer of the ONU. This embodiment includes the buffer, a register circuit, a DBRu information generating circuit, and a transmitting circuit. The buffer is configured to temporarily store the to-be-transmitted upstream data. The register circuit includes a first register configured to record previous data amount information indicative of a previous data amount of the buffer that is determined at a previous time point earlier than a current time point. The DBRu information generating circuit is configured to generate the current DBRu information according to a current data amount of the buffer and a setting value, wherein the setting value is dependent on the difference between current data amount information and the previous data amount information, and the current data amount information is indicative of the current data amount of the buffer that is determined at the current time point. The transmitting circuit is configured to transmit the current DBRu information to the OLT.

An embodiment of the method of the present disclosure can report DBRu information to an OLT with an optical network unit (ONU). This embodiment includes the following steps: temporarily store to-be-transmitted upstream data with a buffer; recording previous data amount information indicative of a previous data amount of the buffer that is determined at a previous time point earlier than a current time point; generating a current DBRu information according to a current data amount of the buffer and a setting value, wherein the setting value is dependent on the difference between current data amount information and the previous data amount information, and the current data amount information is indicative of the current data amount of the buffer that is determined at the current time point; and transmitting the current DBRu information to the OLT.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure includes an optical network unit (ONU) and a method for transmitting Dynamic Bandwidth Report upstream (DBRu). The ONU and method can report DBRu information to an optical line terminal (OLT) according to an amount variation of to-be-transmitted upstream data in a buffer of the ONU and thereby prevent the burst of the to-be-transmitted upstream data from jamming the buffer and causing packet loss.

Figure 4:
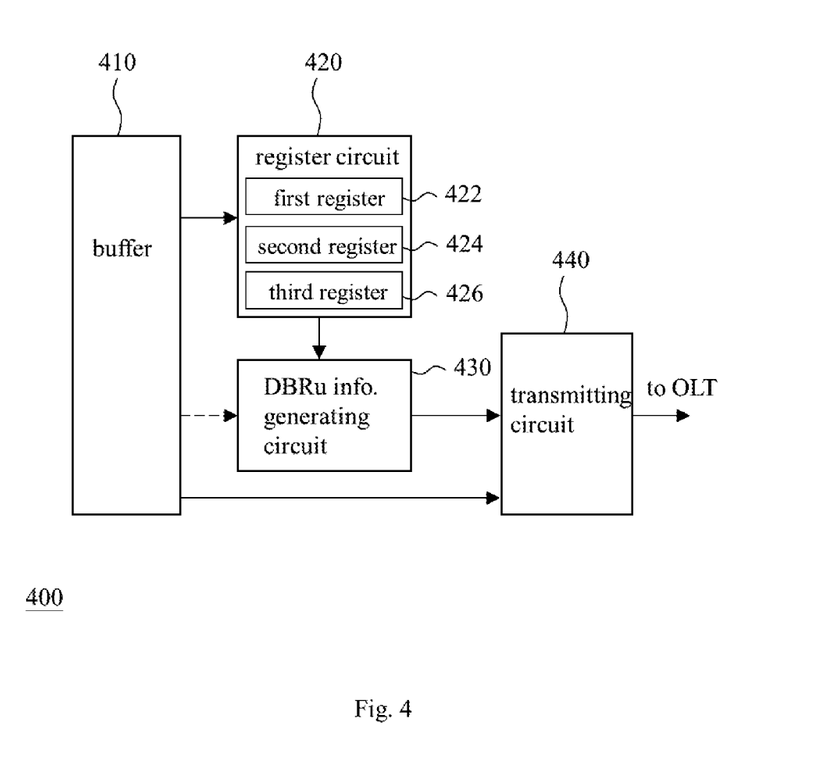
FIG. 4 shows an embodiment of the optical network unit of the present disclosure.

FIG. 4 shows an embodiment of the ONU of the present disclosure. The ONU 400 of FIG. 4 includes a buffer 410, a register circuit 420, a DBRu information (DBRu info.) generating circuit 430, and a transmitting circuit 440.

Please refer to FIG. 4. The buffer 410 (e.g., a first-in-first-out storage circuit) is configured to temporarily store to-be-transmitted upstream data. The register circuit 420 includes a first register 422, a second register 424, and a third register 426. The first register 422 is configured to record previous data amount information indicative of a previous data amount of the buffer 410 that is the data amount of the to-be-transmitted upstream data in the buffer 410 at a previous time point. The second register 424 is configured to record current data amount information indicative of a current data amount of the buffer 410 that is the data amount of the to-be-transmitted upstream data in the buffer 410 at a current time point. The third register 426 is configured to record an information difference between the current data amount information and the previous data amount information. In an alternative embodiment, on condition that the previous data amount information can be obtained instantaneously and/or the information difference can be calculated instantaneously, the second register 424 and/or the third register 426 can be omitted optionally. Since those having ordinary skill in the art can implement the buffer 410 and the register circuit 420 with known or self-developed circuits, redundant description is omitted here.

Please refer to FIG. 4. The DBRu information generating circuit 430 is configured to generate current DBRu information according to the current data amount of the buffer 410 and a setting value. The setting value is dependent on the information difference between the current data amount information and the previous data amount information. The current DBRu information is used for requesting an OLT to allocate a transmission quota that is equal to the current data amount plus an additional data amount, wherein the additional data amount is dependent on the setting value (e.g., the additional data amount is equal to the setting value multiplied by a reporting block size) and can be greater than, equal to, or less than the current data amount. In this embodiment, the DBRu information generating circuit 430 can learn of the current data amount from the register circuit 420 and thus the DBRu information generating circuit 430 has no need to connect the buffer 410 as shown in FIG. 4, the dashed line especially; in an alternative embodiment, the DBRu information generating circuit 430 can learn of the current data amount from the buffer 410. The transmitting circuit 440 is configured to transmit the current DBRu information and the to-be-transmitted upstream data in the buffer 410 to the OLT. Since those of ordinary skill in the art can implement the DBRu information generating circuit 430 and the transmitting circuit 440 with known or self-developed circuits, redundant description is omitted here.

In an exemplary implementation, the aforementioned previous time point can optionally be the time point at which the DBRu information generating circuit 430 generates the previous DBRu information; the DBRu information generating circuit 430 generates the previous DBRu information according to the previous data amount or a previous setting value and the previous data amount and then the transmitting circuit 440 transmits the previous DBRu information to the OLT. The previous setting value is dependent on the difference between the previous data amount information and a former data amount information indicative of the data amount of the to-be-transmitted upstream data in the buffer 410 at a former time point earlier than the previous time point. In an exemplary implementation, the previous DBRu information and current DBRu information are successive DBRu information.

In an exemplary implementation, the data amount of the to-be-transmitted upstream data (e.g., X bytes) in the buffer 410 is equal to a queue length times a reporting block size (e.g., 48 bytes). The queue length falls within one of the eight ranges of queue lengths as shown in Table 1 below, and Table 1 originates from Table 8-1 of the G.984.3 standard of International Telecommunications Union-Telecommunication Standardization Sector (ITU-T). In order to generate the aforementioned setting value according to the queue length quickly, eight report levels are used to denote the eight ranges of queue lengths respectively; therefore, in this exemplary implementation, a current data amount level and a previous data amount level are used to denote the current data amount information and the previous data amount information respectively; for example, the current data amount level is equal to five (i.e., $R\_Level_{CURRENT}=5$) and the previous data amount level is equal to two (i.e., $R\_Level_{PREVIOUS}=2$), and the difference between the current data amount information and the previous data amount information is the level difference between the current data amount level and the previous data amount level (e.g., $R\_Level_{INCREASE}=R\_Level_{CURRENT}-R\_Level_{PREVIOUS}=5-2=3$). The relation between the setting value and the level difference is shown in Table 2 below, wherein on condition that the level difference is seven, which implies that the current data amount level and previous data amount level are seven and zero respectively, the $7^{th}$ setting value is zero. In an alternative embodiment, both the $7^{th}$ setting value and the $1^{st}$ setting value are zero and fixed so as to simplify the design of circuit, and this is because the queue length mentioned in the current DBRu information reported by the ONU 400 in accordance with the current data amount (>8191) already reaches the upper limit as shown in Table 8-1 of the G.984.3 standard. In this embodiment, on condition that "$R\_Level_{CURRENT}-R\_Level_{PREVIOUS}<0$", $R\_Level_{INCREASE}$ is set to be zero. It should be noted that people having ordinary skill in the art can modify Table 1 and Table 2 according to their demand for implementation; for instance, the ranges of queue lengths can be replaced by more kinds of ranges and the setting value can be adjusted.

TABLE 1

| Ranges of queue lengths | Report level |
|---|---|
| 0~127 | 0 |
| 128~255 | 1 |
| 256~511 | 2 |
| 512~1023 | 3 |
| 1024~2047 | 4 |
| 2048~4095 | 5 |
| 4096~8191 | 6 |
| >8191 | 7 |

TABLE 2

| Level difference ($R\_Level_{INCREASE}$) | Setting value |
|---|---|
| 0 | 0 |
| 1 | $1^{st}$ setting value (e.g., 128) |
| 2 | $2^{nd}$ setting value (e.g., 256) |
| 3 | $3^{rd}$ setting value (e.g., 512) |
| 4 | $4^{th}$ setting value (e.g., 1024) |
| 5 | $5^{th}$ setting value (e.g., 2048) |
| 6 | $6^{th}$ setting value (e.g., 4096) |
| 7 | $7^{th}$ setting value (e.g., 0) |

Figure 5:
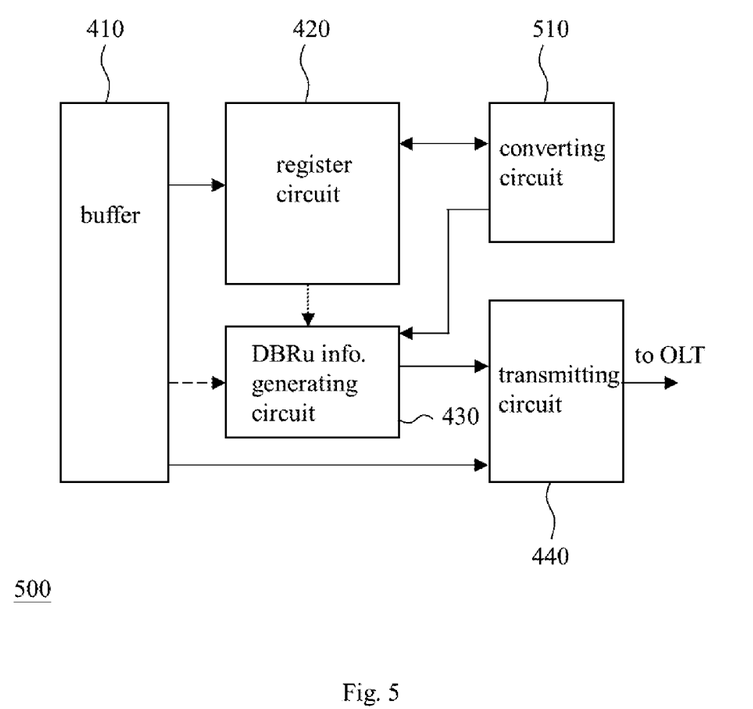
FIG. 5 shows another embodiment of the optical network unit of the present disclosure.

Please refer to FIG. 4 and Tables 1-2. In an exemplary implementation, the queue lengths ($QL_{INITIAL}$) corresponding to the data amounts of the to-be-transmitted upstream data in the buffer 410 at various time points are shown in Table 3 below. As the queue length ($QL_{INITIAL}$) of Table 3 varies, the aforementioned current data amount level, previous data amount level, level difference, and queue length ($QL_{FINAL}$) mentioned in the current DBRu information varies accordingly. The queue length mentioned in the current DBRu information denotes the transmission quota that the ONU 400 requests the OLT to allocate.

converting circuit 510 is optionally included in or independent of the DBRu information generating circuit 430. It should also be noted that the converting circuit 510 can optionally learn of the previous data amount and current data amount of the buffer 410 from the buffer 410, and the register circuit 420 can optionally be coupled to the DBRu information generating circuit 430 according to the demand for implementation as shown in FIG. 5, the dashed line especially. Since those having ordinary skill in the art can implement the converting circuit 510 with known or self-developed circuits (e.g., look-up table circuit), redundant description is omitted here.

Figure 6:
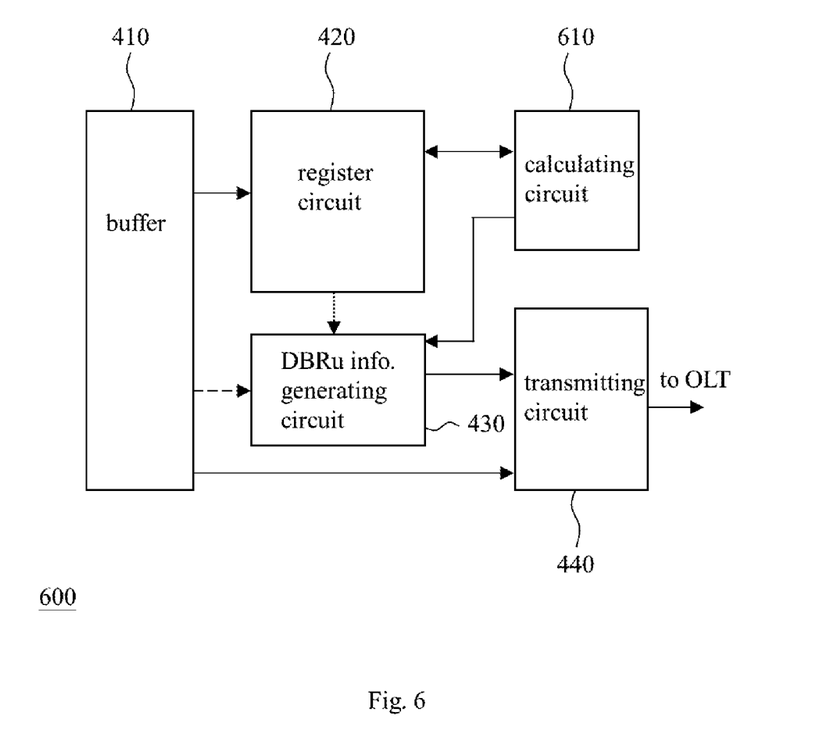
FIG. 6 shows yet another embodiment of the optical network unit of the present disclosure.

FIG. 6 shows yet another embodiment of the ONU of the present disclosure. Compared with FIG. 4, the ONU 600 of FIG. 6 further includes a calculating circuit 610. The calculating circuit 610 is configured to perform the following steps: calculating a burst ratio according to the previous data amount information and the current data amount information; and multiplying the burst ratio by a predetermined data amount to generate the setting value that is fixed or adjustable. For example, the previous data amount information is the queue length ($QL_{PREVIOUS}$) corresponding to the previous data amount of the buffer 410, the current data amount information is the queue length ($QL_{CURRENT}$) corresponding to the current data amount of the buffer 410, the burst ratio is obtained with the following equation $Burst_{RATIO}=(QL_{CURRENT}-QL_{PREVIOUS})/QL_{CURRENT}$, and the predetermined data amount is equal to $$\frac{QL_{CURRENT}}{M},$$

wherein the number M is a positive integer. It should be noted that the calculating circuit 610 is optionally included in or independent of the DBRu information generating circuit 430. It should also be noted that the calculating circuit 610 can learn of the previous data amount and current

TABLE 3

| Time points | $QL_{INITIAL}$ | $R\_Level_{CURRENT}$ | $R\_Level_{PREVIOUS}$ | $R\_Level_{INCREASE}$ | $QL_{FINAL}$ |
|---|---|---|---|---|---|
| start | 0 | 0 | | | |
| 1 | 0 | 0 | 0 | 0 | 0 + 0 |
| 2 | 128 | 1 | 0 | 1 | 128 + $1^{st}$ setting value |
| 3 | 600 | 3 | 1 | 2 | 600 + $2^{nd}$ setting value |
| 4 | 8000 | 6 | 3 | 3 | 8000 + $3^{rd}$ setting value |
| 5 | 8000 | 6 | 6 | 0 | 8000 + 0 |
| 6 | 600 | 3 | 6 | 0 | 600 + 0 |
| 7 | 0 | 0 | 3 | 0 | 0 + 0 |

FIG. 5 shows another embodiment of the ONU of the present disclosure. Compared with FIG. 4, the ONU 500 of FIG. 5 further includes a converting circuit 510 configured to perform at least one of the following steps: generating the previous data amount information (e.g., a report level ($R\_Level_{PREVIOUS}$) in Table 3) according to the previous data amount of the buffer 410; generating the current data amount information (e.g., a report level ($R\_Level_{CURRENT}$) in Table 3) according to the current data amount of the buffer 410; generating the information difference (e.g., a level difference ($R\_Level_{INCREASE}$) in Table 3) between the current data amount information and the previous data amount information; and generating the setting value according to the information difference. It should be noted that the data amount of the buffer 410 from the buffer 410 and thereby generate the previous data amount information and current data amount information, and the register circuit 420 can optionally be coupled to the DBRu information generating circuit 430 according to the demand for implementation as shown in FIG. 6, the dashed line especially. Since those having ordinary skill in the art can implement the calculating circuit 610 with known or self-developed circuits (e.g., subtracting circuit, dividing circuit, and multiplying circuit), redundant description is omitted here.

Figure 7:
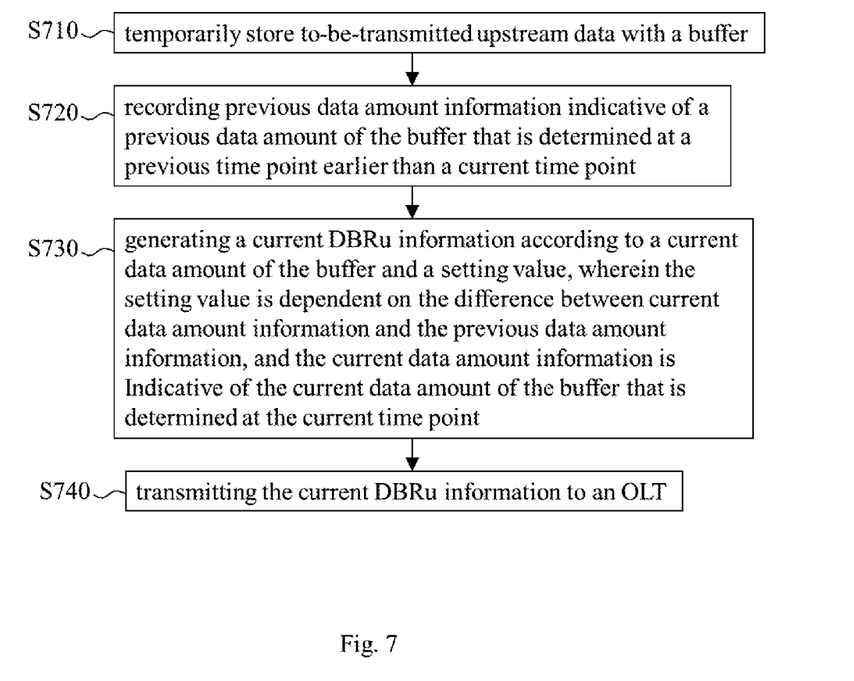
FIG. 7 shows an embodiment of the method of the present disclosure for transmitting DBRu information.

FIG. 7 shows an embodiment of the method of the present disclosure capable of transmitting DBRu information with an ONU (e.g., the aforementioned ONU 400/500/600). This embodiment includes the following steps:

step S710: temporarily store to-be-transmitted upstream data with a buffer;

step S720: recording previous data amount information indicative of a previous data amount of the buffer that is determined at a previous time point earlier than a current time point;

step S730: generating a current DBRu information according to a current data amount of the buffer and a setting value, wherein the setting value is dependent on the difference between current data amount information and the previous data amount information, and the current data amount information is indicative of the current data amount of the buffer that is determined at the current time point; and step S740: transmitting the current DBRu information to an OLT.

Since those having ordinary skill in the art can refer to the disclosure of the embodiments of FIGS. 4-6 to appreciate the detail and modification of the embodiment of FIG. 7, which implies that the features of the embodiments of FIGS. 4-6 can be applied to the embodiment of FIG. 7 in a reasonable way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the present invention can be carried out flexibly.

To sum up, the ONU and method of the present disclosure can report DBRu information according to an amount variation of to-be-transmitted upstream data in a buffer of the ONU and thereby prevent the burst of the to-be-transmitted upstream data from jamming the buffer and causing packet loss.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An optical network unit (ONU) capable of reporting current Dynamic Bandwidth Report upstream (DBRu) information to an optical line terminal (OLT) according to an amount variation of to-be-transmitted upstream data in a buffer, the ONU comprising:
   the buffer configured to temporarily store the to-be-transmitted upstream data;
   a register circuit including:
   a first register configured to record previous data amount information indicative of a previous data amount of the buffer that is determined at a previous time point earlier than a current time point;
   a DBRu information generating circuit configured to generate the current DBRu information according to a current data amount of the buffer and a setting value, wherein the setting value is dependent on the difference between current data amount information and the previous data amount information, and the current data amount information is indicative of the current data amount of the buffer that is determined at the current time point; and
   a transmitting circuit configured to transmit the current DBRu information to the OLT.

2. The ONU of claim 1, wherein the register circuit further includes: a second register configured to record the current data amount information for the DBRu information generating circuit generating the current DBRu information.

3. The ONU of claim 2, wherein the register circuit further includes: a third register configured to record the difference between the current data amount information and the previous data amount information for the DBRu information generating circuit generating the current DBRu information.

4. The ONU of claim 1, wherein the DBRu information generating circuit is configured to generate previous DBRu information according to at least the previous data amount of the buffer, and the transmitting circuit is configured to transmit the previous DBRu information to the OLT.

5. The ONU of claim 1, wherein the previous data amount information and the current data amount information are a previous data amount level and a current data amount level respectively, each of the previous data amount level and the current data amount level is one of multiple predetermined levels, and the setting value is dependent on a difference between the previous data amount level and the current data amount level.

6. The ONU of claim 5, further comprising: a converting circuit configured to generate the previous data amount level according to the previous data amount of the buffer, generate the current data amount level according to the current data amount of the buffer, and generate the setting value according to the previous data amount level and the current data amount level.

7. The ONU of claim 5, wherein on condition that the previous data amount level and the current data amount level are not a minimum level and a maximum level of the multiple predetermined levels respectively, the setting value is proportional to the difference.

8. The ONU of claim 5, wherein on condition that the previous data amount level and the current data amount level are a minimum level and a maximum level of the multiple predetermined levels respectively, the setting value is a minimum data amount.

9. The ONU of claim 5, wherein the multiple predetermined levels include N levels, a maximum data amount of a $(K+1)^{th}$ level of the N levels is equal to two times a maximum data amount of a $K^{th}$ level of the N levels plus one, the N is an integer greater than one, and the K is a positive integer less than the N.

10. The ONU of claim 1, wherein the ONU is configured to use the current DBRu information to request the OLT to allocate a transmission quota, the transmission quota is equal to the current data amount plus an additional data amount, and the additional data amount is dependent on the setting value.

11. The ONU of claim 10, wherein the additional data amount is not greater than the current data amount.

12. The ONU of claim 1, further comprising: a calculating circuit configured to calculate an incremental ratio according to the previous data amount information and the current data amount information and then multiply the incremental ratio by a predetermined data amount to generate the setting value.

13. A method for reporting Dynamic Bandwidth Report upstream (DBRu) information to an optical line terminal (OLT) with an optical network unit (ONU), the method comprising:
   temporarily store to-be-transmitted upstream data with a buffer;

recording previous data amount information indicative of a previous data amount of the buffer that is determined at a previous time point earlier than a current time point;

generating a current DBRu information according to a current data amount of the buffer and a setting value, wherein the setting value is dependent on the difference between current data amount information and the previous data amount information, and the current data amount information is indicative of the current data amount of the buffer that is determined at the current time point; and transmitting the current DBRu information to the OLT.

14. The method of claim 13, wherein the previous data amount of the buffer is a basis for generating a previous DBRu information.

15. The method of claim 13, wherein the previous data amount information and the current data amount information are a previous data amount level and a current data amount level respectively, each of the previous data amount level and the current data amount level is one of multiple predetermined levels, and the setting value is dependent on a difference between the previous data amount level and the current data amount level.

16. The method of claim 15, further comprising: generating the previous data amount level according to the previous data amount of the buffer, generating the current data amount level according to the current data amount of the buffer, and generating the setting value according to the previous data amount level and the current data amount level.

17. The method of claim 15, wherein the multiple predetermined levels include N levels, a maximum data amount of a $(K+1)^{th}$ level of the N levels is equal to two times a maximum data amount of a $K^{th}$ level of the N levels plus one, the N is an integer greater than one, and the K is a positive integer less than the N.

18. The method of claim 13, wherein the current DBRu information is used for requesting the OLT to allocate a transmission quota, the transmission quota is equal to the current data amount plus an additional data amount, and the additional data amount is dependent on the setting value.

19. The method of claim 18, wherein the additional data amount is not greater than the current data amount.

20. The method of claim 13, further comprising: calculating an incremental ratio according to the previous data amount information and the current data amount information and then multiplying the incremental ratio by a predetermined data amount to generate the setting value.

* * * * *